(12) United States Patent
Iijima

(10) Patent No.: US 7,878,072 B2
(45) Date of Patent: Feb. 1, 2011

(54) MEASUREMENT DEVICE INCLUDING AN ELECTRODE HEAD WITH AN ANCHOR FORMED ON AN OUTER PERIPHERAL PORTION

(75) Inventor: Takuya Iijima, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 12/355,333

(22) Filed: Jan. 16, 2009

(65) Prior Publication Data

US 2009/0188328 A1 Jul. 30, 2009

(30) Foreign Application Priority Data

Jan. 30, 2008 (JP) .............................. 2008-019550

(51) Int. Cl.
*G01F 1/58* (2006.01)
(52) U.S. Cl. .................................... 73/861.12
(58) Field of Classification Search ........................ None
See application file for complete search history.

(56) References Cited

U.S. PATENT DOCUMENTS 3,771,361 A 11/1973 Reznick
5,269,191 A * 12/1993 Wada ...................... 73/861.12

FOREIGN PATENT DOCUMENTS

| CN | 1249423 A | 4/2000 |
|---|---|---|
| JP | 3-55865 | 12/1991 |
| JP | 4-74932 | 3/1992 |
| JP | 4-95719 | 3/1992 |
| JP | 4-95819 | 3/1992 |
| JP | 4-198816 | 7/1992 |
| JP | 11-83569 | 3/1999 |
| JP | 2003-262544 | 9/2003 |
| JP | 2004-163193 | 6/2004 |
| JP | 2007-240231 | 9/2007 |

* cited by examiner

*Primary Examiner*—Harshad Patel
(74) *Attorney, Agent, or Firm*—Oblon, Spivak, McClelland, Maier & Neustadt, L.L.P.

(57) ABSTRACT

A measurement device comprises: a container 1 including an aperture 6a; a lining 2 applied to an inner surface of the container 1; an electrode 3 provided in the aperture, and a spring 7 biasing the electrode 3 in a direction from the inside to the outside of the container 1. The electrode 3 includes: an electrode head 3a; an anchor 4 formed on an outer peripheral portion of the electrode head 3a; an electrode shaft 3b formed integrally with the electrode head 3a; and an electrode tapered portion 5 tapered with its diameter gradually reduced from the anchor 4 to the electrode shaft so as to fit in the aperture. The electrode 3 is inserted from the inside of the container 1 so as to expose a part of the electrode shaft 3b out of the container 1.

5 Claims, 7 Drawing Sheets

MEASUREMENT DEVICE INCLUDING AN ELECTRODE HEAD WITH AN ANCHOR FORMED ON AN OUTER PERIPHERAL PORTION

CROSS REFERENCE TO RELATED APPLICATION

This application is based upon and claims the benefit of priority from Japanese Patent Application No. 2008-019550 filed on Jan. 30, 2008, the entire contents of which are incorporated herein by reference.

BACKGROUND OF THE INVENTION

1. Field of the Invention

The present invention relates to a measurement device for measuring various features, state quantities and the like of measurement targets such as liquids, gases or powders. More specifically, the present invention relates to a measurement device provided with an electrode mounting structure having an excellent sealing property.

2. Description of the Related Art

An electromagnetic flow meter configured to measure a flow rate of a liquid has been known as a conventional measurement device for measuring a physical quantity. The electromagnetic flow meter measures the flow rate by applying an electric current to a coil to generate a magnetic field inside a measurement pipe, then by picking up, with an electrode, an electromotive force generated in proportion to the electric conductivity of the liquid flowing inside the measurement pipe, and then by detecting the magnitude of the electromotive force. Generally, a resin lining formed of fluororesin, polyurethane resin or the like is applied to an internal surface of the measurement pipe of this electromagnetic flow meter in order to prevent corrosion.

The electrode used in this electromagnetic flow meter is in direct contact with a measurement target. In general, two types of structures are known as the structure of this electrode. These structures are called an external insertion type and an internal insertion type, respectively. In the external insertion type, an electrode is inserted into the inside of the container from the outside of the container in which a measurement target is to flow or be sealed. The electrode is pressed against the container from the outside by use of a spring and the like to ensure a sealing property of the container (see Japanese Patent Application Laid-Open Publications Nos. 2003-262544, 04-95719 and 2004-163193). In the internal insertion type, the electrode is inserted from the inside to the outside of a container, and the electrode is pulled outwardly from the outside of the container by use of a spring. In this way, an electrode head is closely attached to the container, and the sealing property of the container is thereby ensured (see Japanese Patent Application Laid-Open Publications Nos. 11-83569, 04-198816 (FIG. 2A), 2007-240231, 04-95819, and 03-55865).

SUMMARY OF THE INVENTION

As described above, the electrode of the above-described external insertion type is pressed from the outside by use of the spring or the like to ensure the sealing property. Accordingly, if a biasing force of the spring is weakened by aging or other factors, the force to press the electrode against internal pressure of the container is also weakened. As a consequence, the sealing property is damaged, and the measurement target leaks out of the container.

Moreover, in the electrode of the external insertion type, a sealing property retainer (a sealing unit) is not constituted by the electrode head that is in direct contact with the measurement target inside the container, but by an O-ring or a gasket located in a position close to the outside of the container. Therefore, the measurement target permeates the sealing property retainer. As a result, if the measurement target possesses a corrosive property, the electrode is corroded by formation of an oxygen concentration cell or the like at a portion where the measurement target permeates. If the measurement target possesses a precipitation property, the measurement target precipitates at the portion where the measurement target permeates, thereby spreading a gap between the container and the electrode, and thus destroying the sealing property of the container.

Further, in the case of the electrode of the external insertion type, the electrode is pressed from the outside of the container by use of the spring, and it is therefore necessary to provide a wall for holding the spring (which is generally called a boss). Accordingly, there is a problem of an increase in a process cost by an amount needed to attach this boss to the container by welding or the like.

On the other hand, in the case of the electrode of the internal insertion type, the electrode head is closely attached to the inner surface of the container by pulling the electrode outwardly by using the spring located on the outside. The sealing property is even improved by the internal pressure of the container that presses the electrode head. Therefore, the electrode of the internal insertion type has an advantage in achieving a favorable sealing property. Nevertheless, according to the technique disclosed in Japanese Patent Application Publication No. Hei 11-83569, there is a problem that a gasket, which is placed between tapered portions respectively formed on the container and on the electrode, melts if the measurement target possesses a corrosive property.

Meanwhile, according to the technique disclosed in Japanese Patent Application Laid-Open Publication No. 04-198816, a sealing property retainer is formed by means of area sealing which is established by contact between a tapered portion provided on the electrode and a tapered portion provided on the container. Therefore, if the resin lining provided on the inner surface of the container is made of relatively hard resin such as fluororesin, it is not possible to obtain and maintain contact pressure necessary for retaining the sealing property.

Meanwhile, according to the technique disclosed in Japanese Patent Application Laid-Open Publication No. 2007-240231, as shown in FIGS. 1A and 1B as well as FIGS. 2A and 2B, a protrusion 31 having a semicircular cross section is provided around an outer peripheral portion of an electrode head 30 of an electrode 36, on the opposite side to a surface that is in contact with the measurement target. In this structure, a sealing property retainer is not located on a wide area, but is concentrated on a narrow area. Moreover, by pulling up the sealing property retainer with a spring 32, the contact pressure necessary for retaining the sealing property can be obtained even when a lining 34 provided on an inner surface of a container 33 is made of relatively hard resin such as fluororesin. Here, FIG. 1A shows a cross-sectional view including an axial direction of the container 33 shown in FIG. 1B. FIG. 2A shows a cross-sectional view including a diametrical direction of the container 33 shown in FIG. 2B.

In this technique, a flat surface exists between an electrode shaft 35 and the protrusion 31. Accordingly, in a cross section S1 (see FIG. 1B) in the axial direction as shown in FIG. 1A, this flat surface is closely attached to the container. However, the container 33 has a circular form in a cross section S2 (see FIG. 2B) in the diametrical direction as shown in FIG. 2A. Therefore, this technique has a problem that the sealing property is lost because a gap is formed between this flat surface and the inner surface of the cylindrical container 33.

Further, according to the technique disclosed in Japanese Patent Application Laid-Open Publication No. 04-95819, an electrode head is buried in a container, and a sealing property retainer is a sealing member located deeper than the electrode head. As is similar to the electrode of the external insertion type, this configuration has problems of corrosion of the electrode attributable to an oxygen concentration cell, damage of the sealing property by a deposited material, and melting of the sealing member by corrosion.

Moreover, according to the technique disclosed in Japanese Examined Utility Model Application Publication No. 03-55865, an electrode head is formed to have a flat surface. Therefore, if the resin lining provided on the inner surface of the container is made of relatively hard resin such as fluororesin, it is difficult to obtain contact pressure necessary for retaining the sealing property. Moreover, since the container is formed into a circular shape in its cross section in the diametrical direction, a gap is formed between the flat surface of the electrode head and the inner surface of the cylindrical container, which damages the sealing property.

The present invention has been made for solving the above-described problems. An object of the present invention is to provide a low-cost measurement device provided with an electrode mounting structure having an excellent sealing property.

An aspect of the present invention provides a measurement device comprising: a container in which a measurement target flows or is sealed, the container including an aperture; a lining which is applied to an inner surface of the container; an electrode provided in the aperture; and a spring configured to bias the electrode in a direction from the inside to the outside of the container; wherein the electrode includes: an electrode head provided with a first surface, which is exposed to the inside of the container and is in contact with the measurement target, and a second surface located on an opposite side to the first surface; an anchor formed on an outer peripheral portion of the electrode head so as to protrude from the second surface and to be buried in the lining; an electrode shaft formed integrally with the electrode head so as to extend toward the opposite side of the first surface; and an electrode tapered portion tapered with its diameter gradually reduced from the anchor to the electrode shaft so as to fit in the aperture; and wherein the electrode is inserted from the inside of the container so as to expose a part of the electrode shaft out of the container.

The first surface may be formed into any of a semispherical shape and a flat shape.

The anchor may be formed into any of a semicircular shape and a triangular shape in its cross-section including an axis of the electrode.

A V-shaped groove may be formed on a surface of the electrode tapered portion in a circumferential direction of the electrode tapered portion.

The measurement device may further comprise a sealing member. The aperture may further include a tapered portion tapered with its diameter gradually reduced from an outer surface to the inner surface of the container, and the sealing member may be fitted to the tapered portion on the aperture and be biased from the outside to the inside of the container by the spring.

According to the present invention, a low-cost measurement device provided with an electrode mounting structure having an excellent sealing property, can be provided.

DESCRIPTION OF THE EMBODIMENTS

Hereinafter, embodiments of the present invention will be described below in detail with reference to the accompanying drawings. It is to be noted that an electromagnetic flow meter will be used in the following description as an example of a measurement device that includes an electrode mounting structure of the present invention.

First Embodiment

Figure 1A:
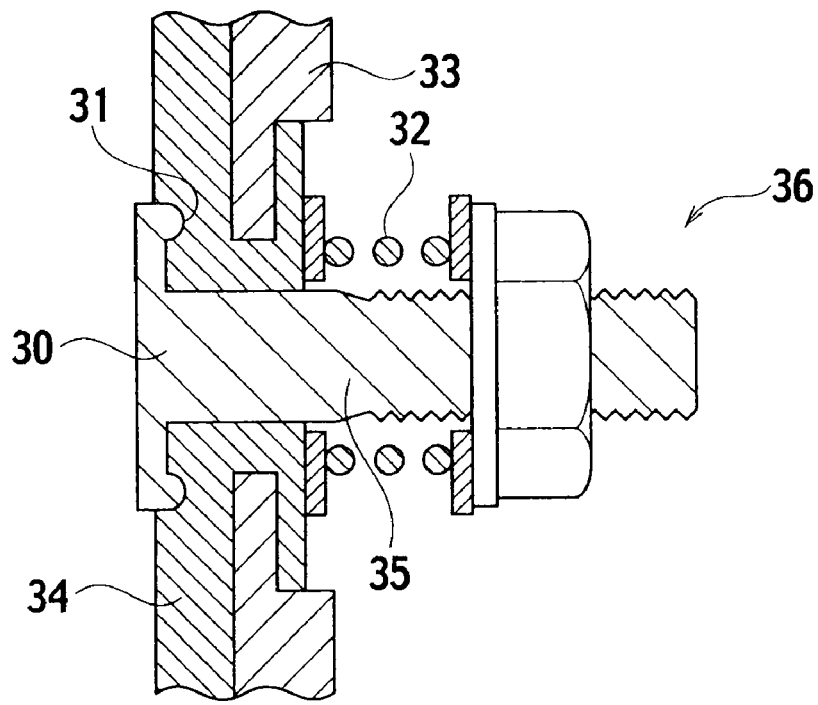
FIG. 1A is a cross-sectional view of an electrode and its surrounding part of a conventional electromagnetic flow meter.
Figure 1B:
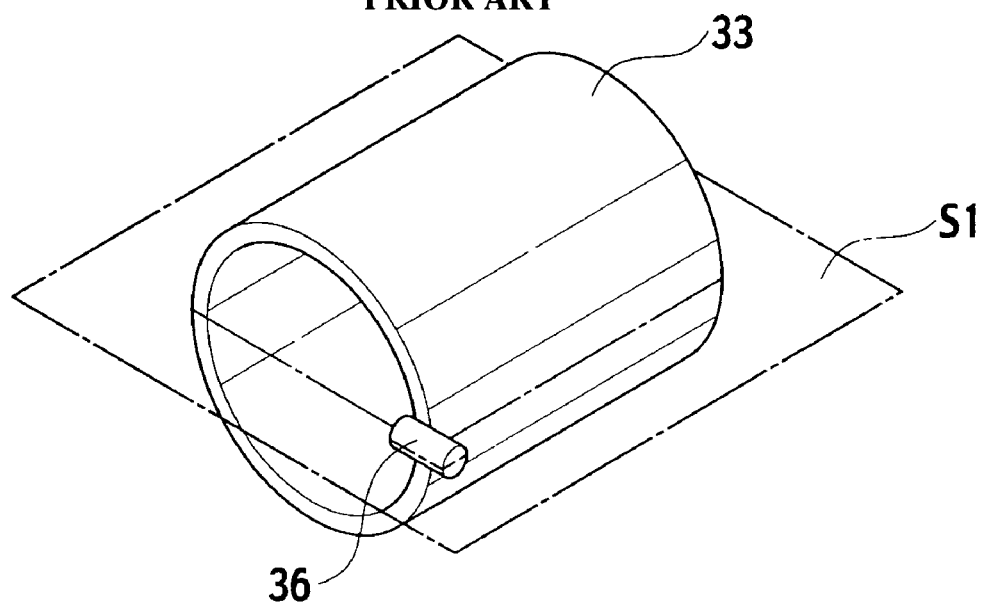
FIG. 1B is a view schematically showing a position of the cross section shown in FIG. 1A.
Figure 2A:
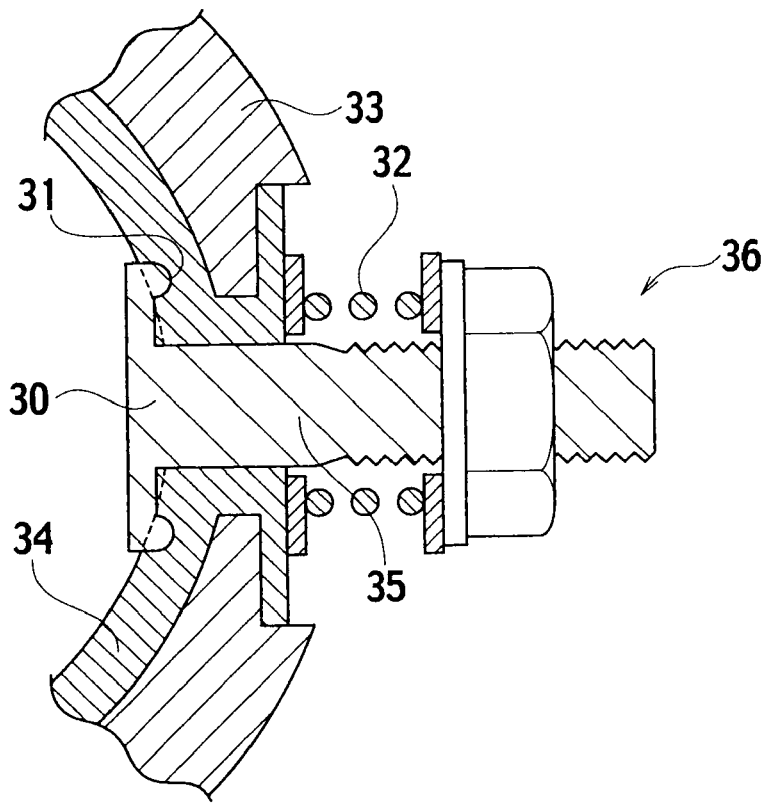
FIG. 2A is a cross-sectional view of an electrode and its surrounding part of another conventional electromagnetic flow meter.
Figure 2B:
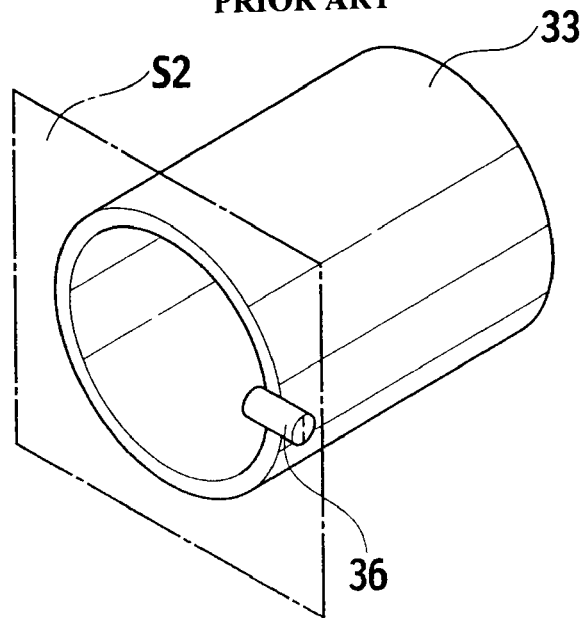
FIG. 2B is a view schematically showing a position of the cross section shown in FIG. 2A.
Figure 3:
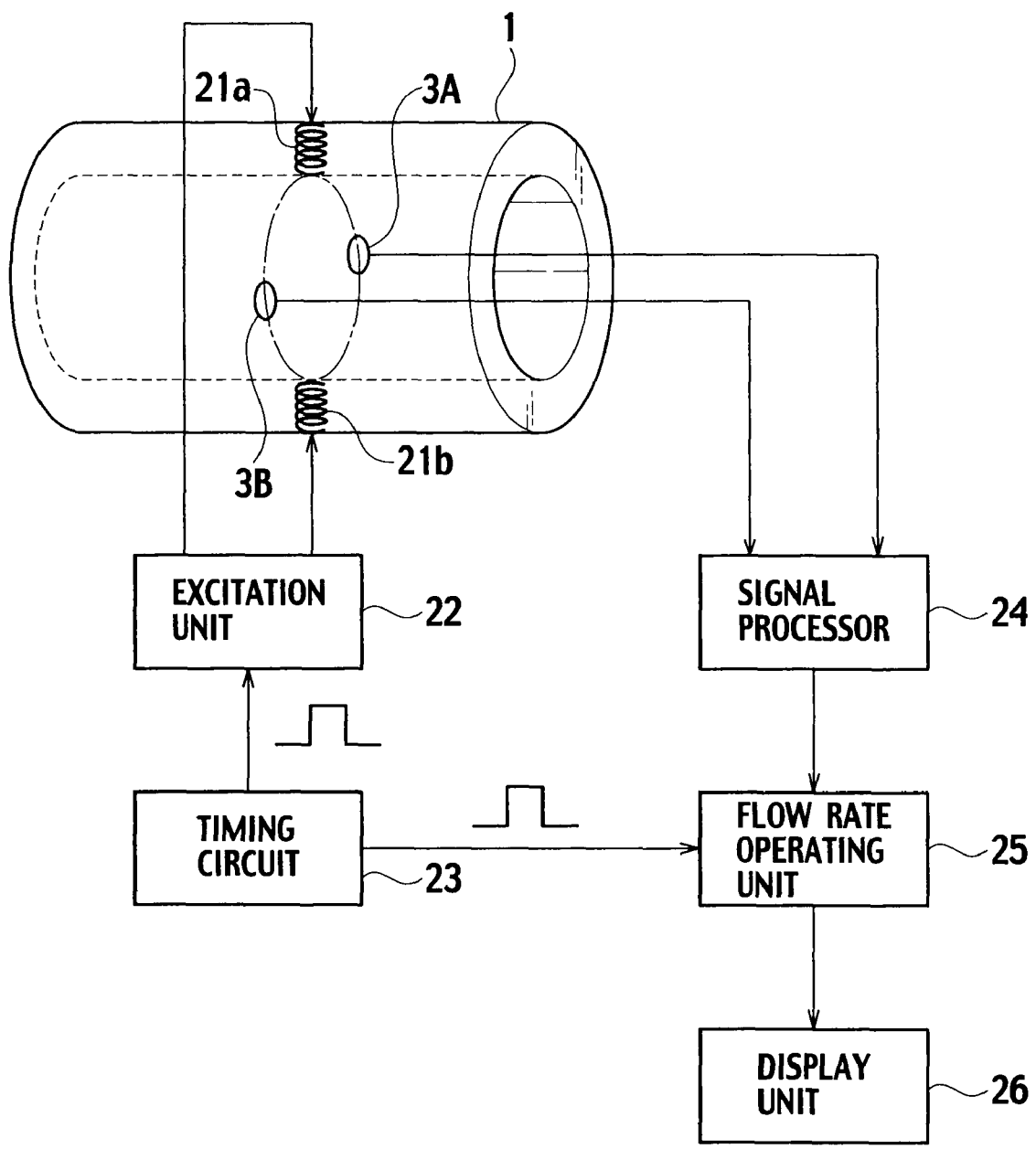
FIG. 3 is a schematic drawing showing the principle of an electromagnetic flow meter serving as a measurement device according to a first embodiment of the present invention.

As shown in FIG. 3, in an electromagnetic flow meter according to a first embodiment of the present invention, a measurement pipe 1 through which a fluid as a measurement target flows, is provided with a pair of coils 21a and 21b which are located to face each other. The measurement pipe 1 is made of metal or insulator such as ceramic material or the like. Moreover, a pair of electrodes 3A and 3B that face each other are provided orthogonally to the pair of coils 21a and 21b.

An excitation current is supplied from an excitation unit 22 to the pair of coils 21a and 21b. The excitation unit 22 generates the excitation current corresponding to a square-wave timing signal sent from a timing circuit 23 and transmits the current to the pair of coils 21a and 21b as described previously. The timing circuit 23 is formed of a microcomputer, for example, and is configured to generate the square-wave timing signal for defining measurement timing and sends the signal to the excitation unit 22 and to a flow rate operating unit 25.

Signals detected by the pair of electrodes 3A and 3B are sent to a signal processor 24. The signal processor 24 performs processing, such as amplification and noise filtering, with the signals sent from the pair of electrodes 3A and 3B, then detects a potential difference between the signals, converts the potential difference into a digital signal, and sends the digital signal to the flow rate operating unit 25. In response to the timing signal sent from the timing circuit 23, the flow rate operating unit 25 calculates a flow rate based on the signal sent from the signal processor 24, and sends a signal indicating the flow rate to a display unit 26. The display unit 26 is formed of an LCD (liquid crystal display), for example, and is configured to display the flow rate in response to the signal indicating the flow rate which is sent from the flow rate operating unit 25.

Next, operations of the electromagnetic flow meter having the above configuration will be described. First, the timing circuit 23 generates a timing signal at predetermined measurement timing and sends the timing signal to the excitation unit 22 and to the flow rate operating unit 25. The excitation unit 22 generates an excitation current in response to the timing signal sent from the timing circuit 23 and sends the excitation current to the pair of coils 21a and 21b. Thereby, a magnetic field is generated between the coil 21a and the coil 21b inside the measurement pipe 1. The measurement target fluid flows in this magnetic field and cuts a magnetic flux, whereby an electromotive force is generated in the measurement target fluid. Signals indicating the electromotive force thus generated in the measurement target fluid are sent to the signal processor 24 through the pair of electrodes 3A and 3B.

The signal processor 24 detects the magnitude of the electromotive force by calculating a potential difference between the signals sent from the pair of electrodes 3A and 3B, converts the potential difference into a digital signal, and sends the digital signal to the flow rate operating unit 25. In response to the timing signal sent from the timing circuit 23, the flow rate operating unit 25 calculates a flow rate based on the signal sent from the signal processor 24, and sends a signal indicating the flow rate to the display unit 26. The display unit 26 displays the flow rate in response to the signal indicating the flow rate which is sent from the flow rate operating unit 25.

Figure 4:
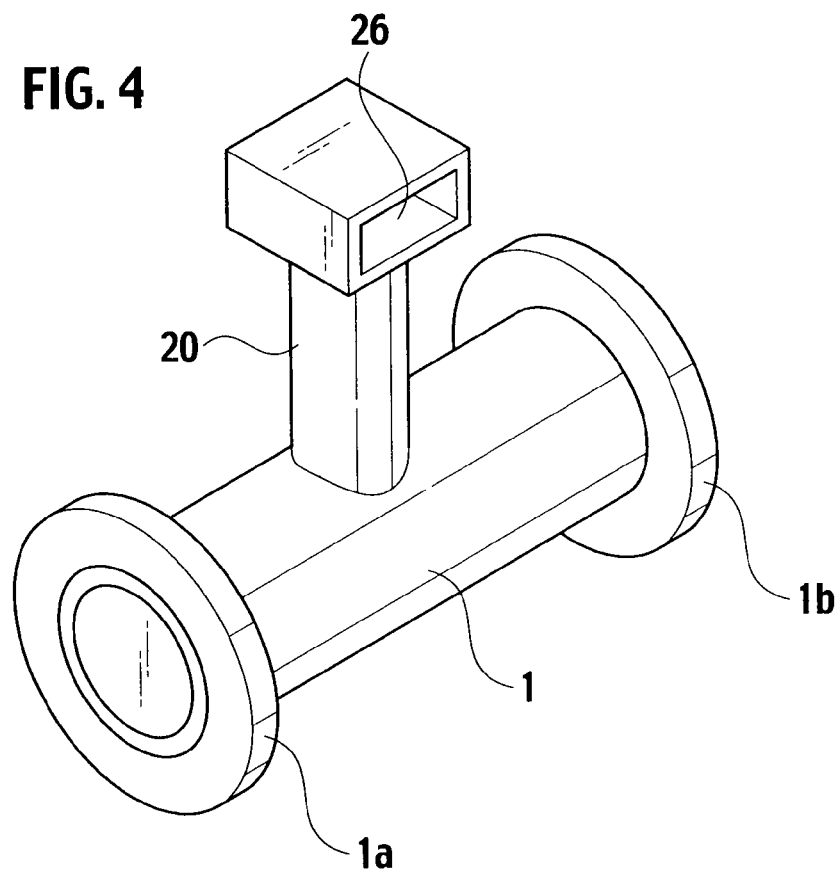
FIG. 4 is an external perspective view of the electromagnetic flow meter.

As shown in FIG. 4, flanges 1a and 1b are provided on both ends of the measurement pipe 1 so as to be connected to pipes (not shown). Moreover, an electrode unit 20 containing the electrode 3A is provided almost in the center of the measurement pipe 1. Here, the electromagnetic flow meter also includes an electrode unit for containing the electrode 3B. However, FIG. 4 shows just one of the electrode units 20.

Figure 5:
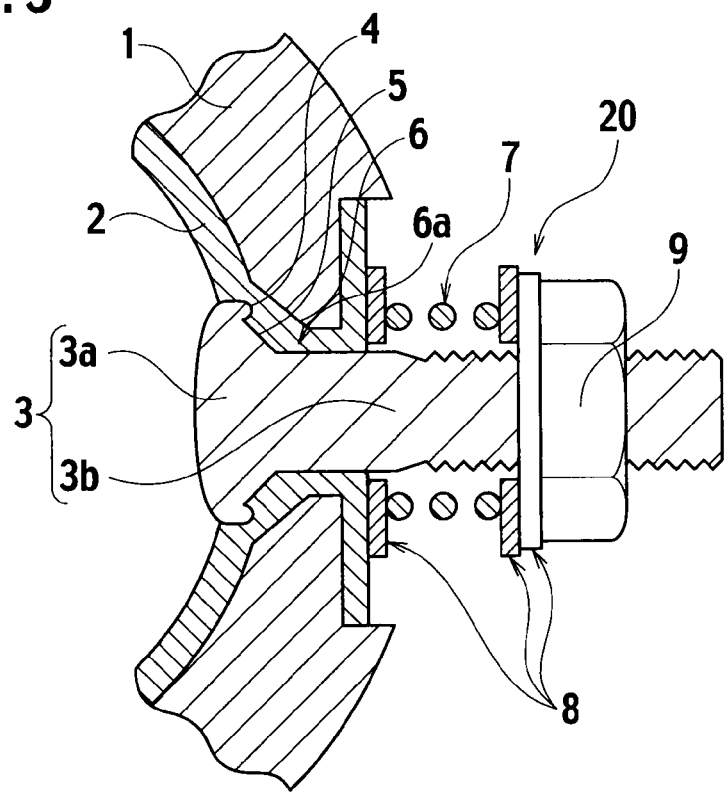
FIG. 5 is a cross-sectional view of structures of an electrode and its surrounding part according to the first embodiment of the present invention.
Figure 6:
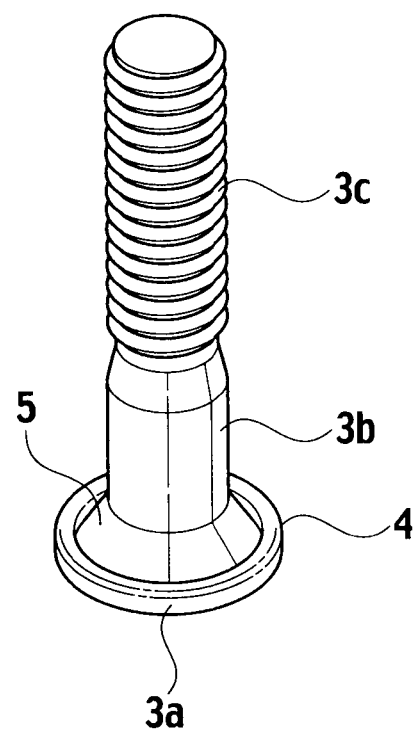
FIG. 6 is an external perspective view of the electrode according to the first embodiment of the present invention.

As shown in FIG. 5, the electrode unit 20 includes the electrode 3, a spring 7, spacers 8, and a nut 9. FIG. 6 is an external perspective view of the electrode 3.

The measurement pipe 1, which serves as a container in which the measurement target is to flow or be sealed, is provided with an aperture 6a. The aperture 6a includes a container tapered portion 6 which is tapered with the diameter gradually reduced from an inner surface of the measurement pipe 1 toward an outer surface thereof. A lining 2 is attached to the inner surface and the aperture 6a of the measurement pipe 1 so as to prevent the measurement pipe 1 from corrosion by the measurement target. The electrode 3 is inserted from the inside of the measurement pipe 1 to this aperture 6a.

The electrode 3 includes an electrode head 3a and an electrode shaft 3b that continues to this electrode head 3a. The electrode head 3a is exposed to the inside of the measurement pipe 1 and provided with a surface which is in direct contact with the measurement target. Screw threads 3c are formed over a portion of the electrode shaft 3b located outside the measurement pipe 1, and the nut 9 is screwed onto these screw threads 3c. A surface of the electrode head 3a which is in contact with the measurement target, i.e. a surface exposed to the inside of the measurement pipe 1 (a first surface: a vertex) is formed into a semispherical shape that protrudes to the inside of the measurement pipe 1.

An anchor 4 is formed on the outer periphery of the electrode head 3a, which is the opposite surface (a second surface) to the surface in contact with the measurement target. The anchor 4 is a protrusion. This protrusion is formed so as to have a semicircular shape smaller than a radius of the electrode shaft 3b in its cross section including an axis of the electrode 3.

Moreover, an electrode tapered portion 5 is provided over a portion between the anchor 4 at the electrode head 3a and the electrode shaft 3b. The electrode tapered portion 5 is tapered with the diameter gradually reduced from the anchor 4 to the electrode shaft 3b so as to fit into the container tapered portion 6 on the aperture 6a.

While interposing the spring 7 sandwiched between the spacers 8, the nut 9 is screwed onto the portion of the electrode shaft 3b outside of the measurement pipe 1, the electrode shaft 3b being inserted from the inside of the measurement pipe 1. Thereby, the electrode 3 is always biased in the direction from the inside to the outside of the measurement pipe 1.

In the first embodiment configured as described above, the portion of the electrode head 3a exposed to the inside of the measurement pipe 1 is formed into the semispherical shape. Therefore, when the measurement target flows inside the measurement pipe 1, this shape acts to increase a flow velocity of the measurement target at the vertex of the electrode head 3a.

The anchor 4 formed on the electrode head 3a includes the semicircular protrusion having a relatively small diameter. Accordingly, the anchor 4 is easily buried into the lining 2 with a relatively small force to pull the electrode 3 from the inside to the outside of the measurement pipe 3. As a result, the anchor 4 establishes line sealing instead of face sealing and thereby acts to increase contact pressure.

Moreover, when the pressure inside the measurement pipe 1 increases and thus presses the electrode head 3a, the electrode tapered portion 5 at the electrode head 3a is closely attached to the container tapered portion 6 at the measurement pipe 1 by way of the increased pressure. In this way, the contact pressure between the electrode tapered portion 5 and the container tapered portion 6 is increased.

As described above, according to the first embodiment of the present invention, the electrode head 3a increases the flow velocity of the measurement target by forming its vertex into the semispherical shape. Therefore, it is possible to reduce adhesion or precipitation of the measurement target on the electrode head 3a and to reduce deposition of the measurement target on the electrode head 3a.

Moreover, even when the lining 2 is made of relatively hard resin such as fluororesin, the anchor 4 formed on the electrode head 3a is easily buried into the lining 2 with a small force. Therefore, it is possible to obtain the contact pressure necessary for retaining the sealing property of the measurement pipe 1.

Further, when the pressure inside the measurement pipe 1 increases, so does the force to press the electrode head 3a. The pressing force accordingly increases the force to press the electrode tapered portion 5 of the electrode head 3a to the container tapered portion 6. Therefore, the contact pressure between the electrode tapered portion 5 and the container tapered portion 6 becomes stronger and the sealing property is thereby enhanced. As a result, a self-sealing function is achieved.

Moreover, the spring 7 always pulls the electrode 3 from the inside to the outside of the measurement pipe 1. Accordingly, even if the thickness of the lining 2 changes due to aging or if the position of the electrode 3 is displaced by variation in the force to press the electrode head 3a due to a change in the internal pressure of the measurement pipe 1, it is possible to ensure and maintain the sealing property by causing the electrode 3 to follow the positional change.

Second Embodiment

Figure 7:
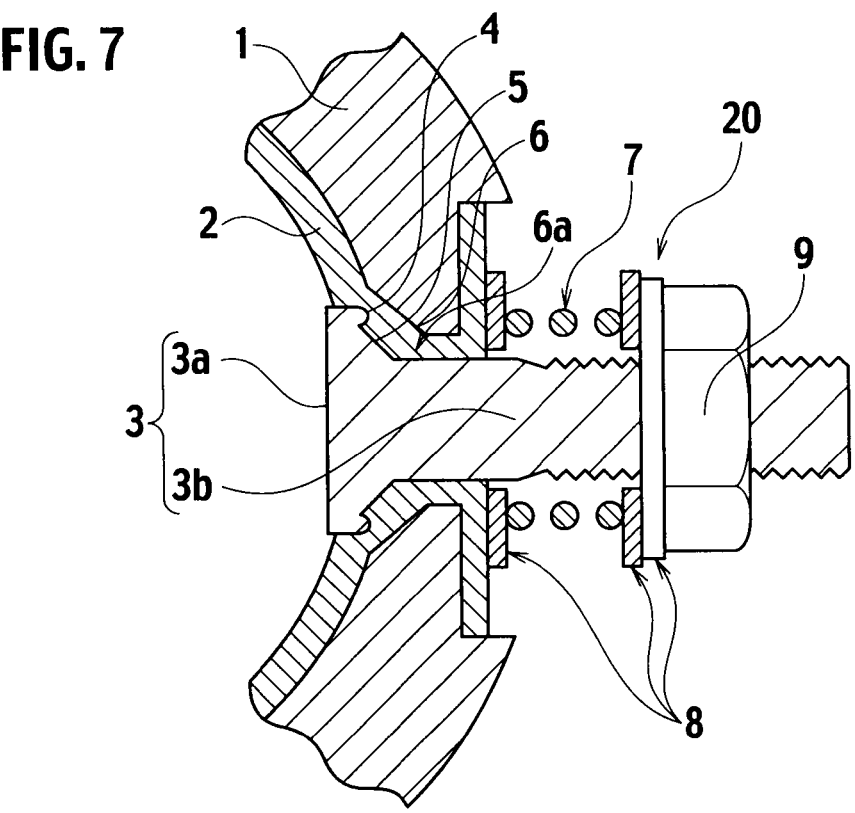
FIG. 7 is a cross-sectional view of structures of an electrode and its surrounding part according to a second embodiment of the present invention.

As shown in FIG. 7, in a measurement device according to a second embodiment of the present invention, the structure of the electrode head 3a of the electrode 3 of the first embodiment is changed. In the following description, the same constituents as those in the first embodiment are designated by the same reference numerals used in the first embodiment, and the description thereof will be omitted.

In the second embodiment, the electrode head 3a is formed to have a flat surface that is exposed to the inside of the measurement pipe and is in direct contact with the measurement target (a first surface: a vertex).

This second embodiment achieves operations and effects similar to those in the first embodiment although the effects to prevent adhesion, precipitation and deposition of the measurement target may be reduced. Note that the second embodiment achieves exactly the same operations and effects as those in the first embodiment provided that the measurement target does not possess an adhesion property, a precipitation property or a deposition property.

Third Embodiment

Figure 8:
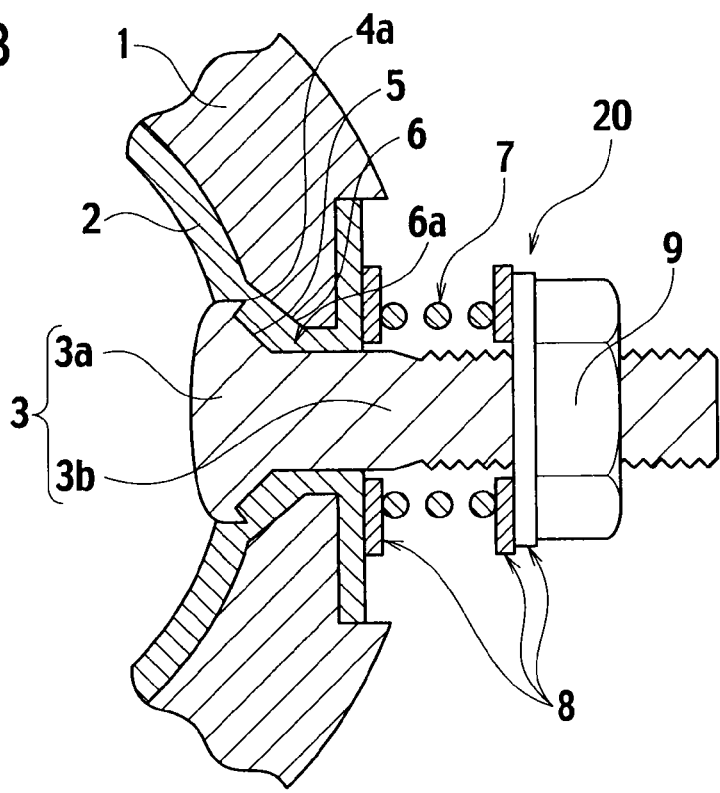
FIG. 8 is a cross-sectional view of structures of an electrode and its surrounding part according to a third embodiment of the present invention.

As shown in FIG. 8, in a measurement device according to a third embodiment of the present invention, the anchor 4 formed on the electrode head 3a of the electrode 3 according to the first embodiment is replaced by an anchor 4a. In the following description, the same constituents as those in the first embodiment are designated by the same reference numerals used in the first embodiment, and the description thereof will be omitted.

The anchor 4a is formed into a triangular protrusion in its cross section including the axis of the electrode 3.

In addition to the operations and effects similar to those in the first embodiment, the third embodiment achieves, as an anchor effect, a higher effect than the first embodiment in retaining the sealed state.

In the third embodiment, the anchor 4 formed on the electrode head 3a according to the first embodiment is replaced by the anchor 4a. However, it is also possible to replace the anchor 4 formed on the electrode head 3a according to the second embodiment by the anchor 4a.

Fourth Embodiment

Figure 9:
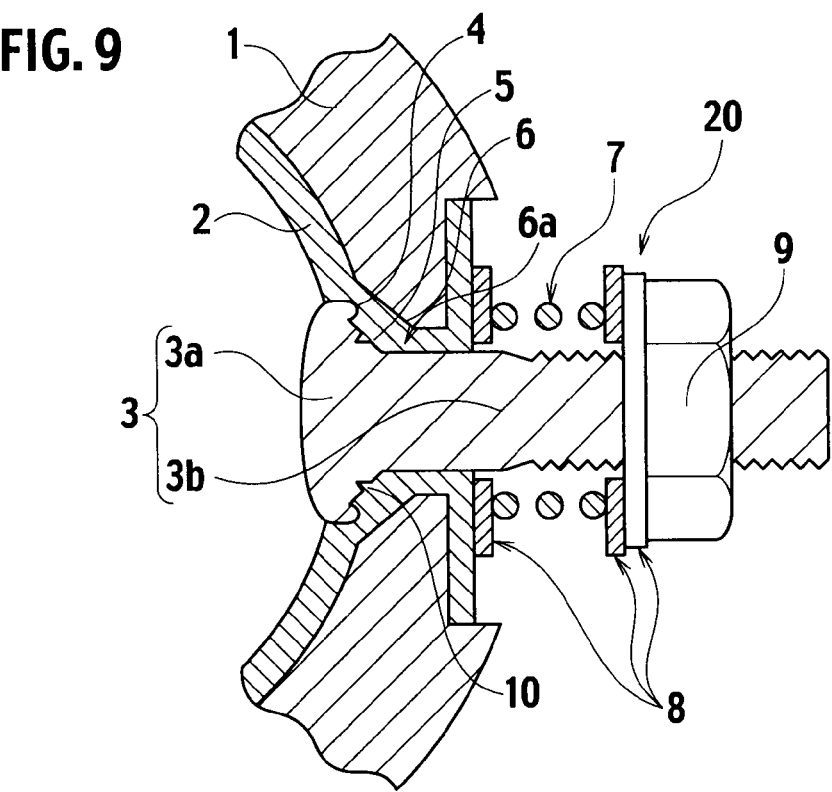
FIG. 9 is a cross-sectional view of structures of an electrode and its surrounding part according to a fourth embodiment of the present invention.

As shown in FIG. 9, in a measurement device according to a fourth embodiment of the present invention, the electrode tapered portion 5 on the electrode 3 according to the first embodiment is provided with a V-shaped groove 10 along a circumferential direction of the electrode tapered portion 5. In the following, the same constituents as those in the first embodiment are designated by the same reference numerals used in the first embodiment, and the description thereof will be omitted.

In the fourth embodiment, the lining 2 is buried into the V-shaped groove 10. Accordingly, in addition to the operations and effects similar to those achieved by the first embodiment, the fourth embodiment further achieves a higher sealing property by way of the sealed surface formed between the electrode tapered portion 5 and the container tapered portion 6.

In the fourth embodiment, the V-shaped groove 10 is provided on the electrode tapered portion 5 of the electrode head 3a according to the first embodiment. However, the V-shaped groove 10 may also be provided on the electrode tapered portion 5 of the electrode 3 according to the second or third embodiment.

Fifth Embodiment

Figure 10:
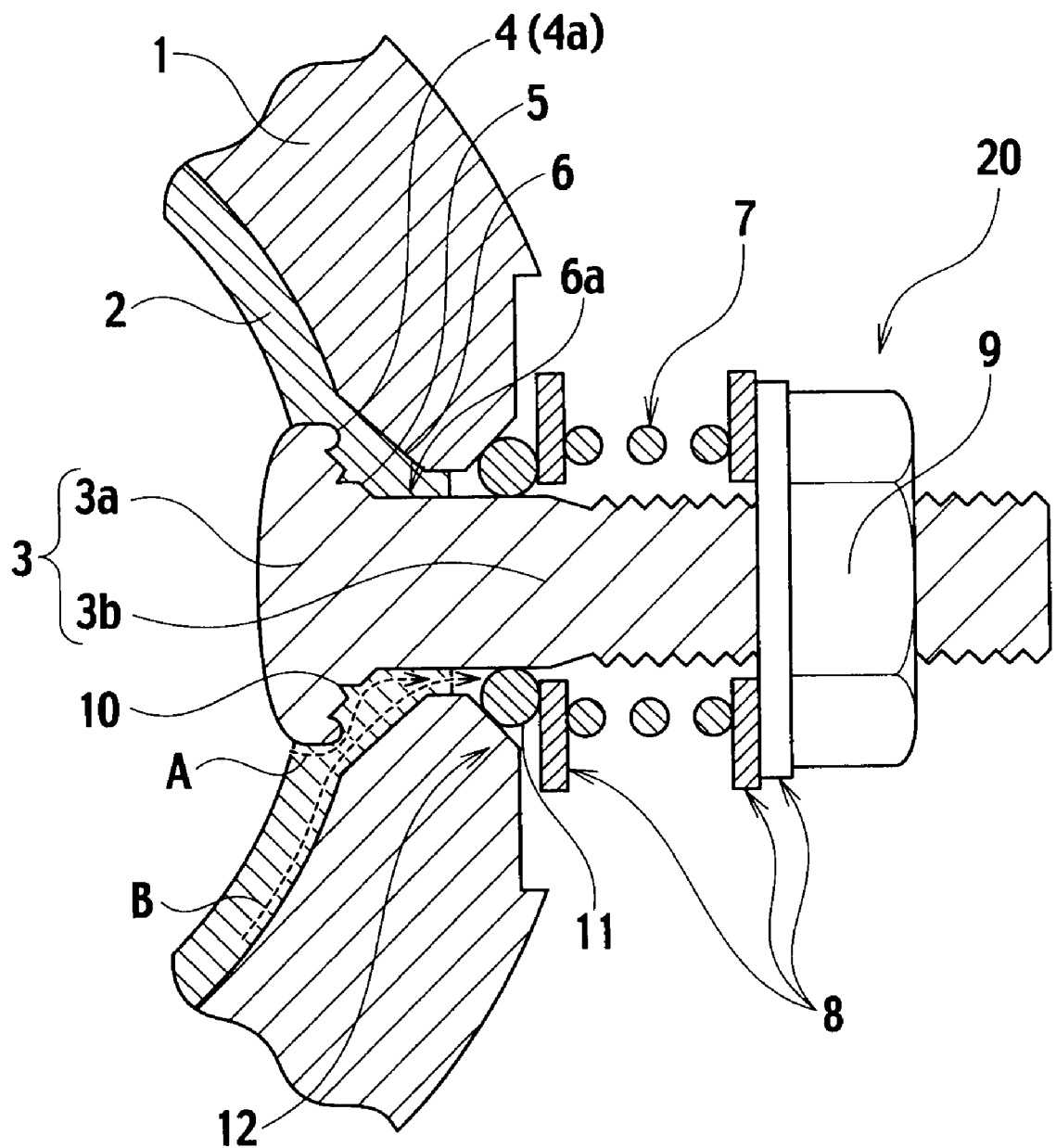
FIG. 10 is a cross-sectional view of structures of an electrode and its surrounding part according to a fifth embodiment of the present invention.

As shown in FIG. 10, a measurement device according to a fifth embodiment of the present invention is a modification of the fourth embodiment. In the following description, the same constituents as those in the first embodiment are designated by the same reference numerals used in the first embodiment and the description thereof will be omitted.

In the measurement device according to the fifth embodiment, the aperture 6a of the measurement pipe 1 includes a secondary tapered portion 12 which is tapered with the diameter gradually reduced from the outer surface of the measurement pipe 1 toward the inner surface thereof. The lining 2 is attached to a range from the inner surface of the measurement pipe 1 to a point between the container tapered portion 6 and the secondary tapered portion 12. Moreover, one of the spacers 8 is interposed between the secondary tapered portion 12 and the spring 7, and a sealing member (such as an O-ring) 11 is fitted thereto. The sealing member 11 acts to prevent an inflow of gas permeating the lining and to retain the sealing property. The sealing member retains the sealing property of the container even if a gap is formed between the electrode 3 and the lining 2. Specifically, for example, when the measurement target leaks out as indicated by a dotted line A or when a liquid or a gas permeates the lining 2 as indicated by a dotted line B, it is possible to prevent further leakage of these materials.

In addition to the operations and effects similar to those achieved by the fourth embodiment, the fifth embodiment can avoid further leakage of the liquid or the gas permeating the lining 2 or leakage of the measurement target to the outside of the measurement pipe 1, the measurement target accidentally having passed through the sealing property retaining structure provided on the electrode head 3a.

In the fifth embodiment, the secondary tapered portion 12 is added to the fourth embodiment so as to fit the sealing member 11 thereto. However, the secondary tapered portion 12 may also be added to any of the first to third embodiments so as to fit the sealing member 11 thereto.

It is to be understood that the present invention is not limited only to the electromagnetic flow maters according to the first to fifth embodiments. Although the container tapered portion 6 is formed on the container 1 in the first to fifth embodiments, it is also possible to form only the electrode tapered portion 5 without forming the container tapered portion 6 on the container 1. Similar effects to those described in the first to fifth embodiments are also obtained in this case.

INDUSTRIAL APPLICABILITY

The present invention is applicable to a water mater, a gas meter, and so forth.

What is claimed is:
1. A measurement device comprising:
    a container in which a measurement target flows or is sealed, the container including an aperture;

a lining which is applied to an inner surface of the container;

an electrode provided in the aperture;

a sealing member; and a spring configured to bias the electrode in a direction from the inside to the outside of the container;

wherein the electrode includes:

an electrode head provided with a first surface, which is exposed to the inside of the container and is in contact with the measurement target, and a second surface located on an opposite side to the first surface;

an anchor formed on an outer peripheral portion of the electrode head so as to protrude from the second surface and to be buried in the lining;

an electrode shaft formed integrally with the electrode head so as to extend toward the opposite side of the first surface; and an electrode tapered portion tapered with its diameter gradually reduced from the anchor to the electrode shaft so as to fit in the aperture; and wherein the electrode is inserted from the inside of the container so as to expose a part of the electrode shaft out of the container, wherein the aperture is formed with a first tapered portion and a second tapered portion, the first tapered portion is tapered from an outer surface of the container with its diameter gradually reduced from the outer surface to the inner surface of the container, and the second tapered portion is tapered from an inner surface of the container with its diameter gradually reduced from the inner surface to an outer surface of the container, and wherein the sealing member is fitted to the first tapered portion on the aperture and is biased from the outside to the inside of the container by the spring.

2. The measurement device according to claim 1, wherein the first surface is formed into any of a semispherical shape and a flat shape.

3. The measurement device according to claim 1, wherein the anchor is formed into any of a semicircular shape and a triangular shape in its cross-section including an axis of the electrode.

4. The measurement device according to claim 1, wherein a V-shaped groove is formed on a surface of the electrode tapered portion in a circumferential direction of the electrode tapered portion.

5. The measurement device according to claim 1, wherein the sealing member is disposed separately from the lining.

* * * * *